United States Patent [19]

Fujimori

[11] Patent Number: 5,294,458
[45] Date of Patent: Mar. 15, 1994

[54] PET FOOD

[75] Inventor: Isao Fujimori, Tsukuba, Japan

[73] Assignees: Maruha Corporation; Ensuiko Sugar Refining Co., Ltd., both of Tokyo, Japan

[21] Appl. No.: 935,111

[22] Filed: Aug. 27, 1992

[51] Int. Cl.$^5$ .................................................. A23L 1/30
[52] U.S. Cl. ................................... 426/635; 426/658; 426/805; 426/2; 435/97
[58] Field of Search .................... 426/635, 658, 805, 2; 435/97

[56] References Cited

U.S. PATENT DOCUMENTS 4,859,488 8/1989 Kan et al. ............................ 426/658

FOREIGN PATENT DOCUMENTS 57-58905 12/1982 Japan .
59-53835 12/1984 Japan .
3-27285 2/1991 Japan .

OTHER PUBLICATIONS

Terada et al "Effect of Dietary Lactosucrose on Faecal Flora & Faecal Metabolites of Dogs" Microb. Ecol. Health Dis. (1992) pp. 87–92 cited as Biosis Abstract No. 94035002.

"Effect of Lactosucrose Intake on Intestinal Flora of Dogs" published by Japanese Society of Veterinal Science on Apr. 4, 1992.

"Effect of Lactosucrose Intake on Intestinal Flora of Cats" published by Japanese Society of Veterinal Science on Sep. 3, 1991.

Primary Examiner—Joseph Golian
Attorney, Agent, or Firm—Kanesaka & Takeuchi

[57] ABSTRACT

The pet food of the present invention contains lactosucrose which is substantially uniformly mixed in a meal in a range of 0.025 to 3.0% by weight on a dry basis. Lactosucrose keeps intestines of the pets in order, and provides a good taste and a great effect on deodorizing feces and urine discharged by the pets.

3 Claims, No Drawings

PET FOOD

BACKGROUND OF THE INVENTION AND RELATED ART STATEMENT

The present invention relates to a pet food suitable for mainly breeding pets such as dogs and cats, more particularly, pet food having a good taste, a function for keeping intestines of the pets in order, and an effect for deodorizing unpleasant odors of feces and urine discharged by the pets.

Recently, there has an been an increasing craze for breeding pets, and the number of pets bred inside houses has been increasing. For pets bred outside as well as pets bred indoors, unpleasant odors from the feces and urine discharged by the pets have been an issue.

Therefore, various methods for deodorizing the unpleasant odors from the discharged feces and urine have been developed. For example, there have been proposed various methods, such as (1) feeding a food containing various materials which have an effect for deodorizing discharged wastes;

(2) feeding water containing materials having a deodorizing effect;

(3) directly spraying a deodorant into a pet waste container; or (4) spraying a deodorant, such as perfume and fragrance, inside a house.

However, any of these methods does not have satisfactory effect for deodorizing wastes discharged by the pets. Especially, in the method of (1), since a moisture content in the discharged wastes tends to be high, it takes time and labor for an owner to dispose of the discharged wastes. The method of (3) requires a pet owner's work for spraying the deodorant.

As explained above, there has been no satisfactory method for deodorizing pets' wastes without requiring pet owners' labor. If, by daily intake of food, intestinal flora of pets is changed to keep intestines of the pets in order and to eliminate an unpleasant odor from the wastes discharged by the pets, it is possible to breed the pets in a more clean atmosphere which is a great boon to owners of the pets as companions.

Accordingly, an object of the present invention is to solve the problems accompanying in the related art and to provide a pet food having a good taste, a function for keeping intestines in order and an effect for eliminating unpleasant odors from the wastes discharged by the pets.

Another object of the present invention is to provide a pet food as stated above, wherein the pet food can be easily and economically manufactured.

Further objects and advantages of the invention will be apparent from the following description of the invention.

SUMMARY OF THE INVENTION

A pet food according to the present invention comprises lactosucrose having distinctive characteristics superior to fructooligosaccharide in metabolizing of intestinal flora, which is substantially uniformly mixed in other food in a range of 0.025 to 3.0% by weight as calculated on a dry basis to obtain an excellent result.

More specifically, the pet foods for dogs and cats can be classified into a dry type, a semi-moist soft dry type and a wet type as can be seen in a "Nutrition Standard of Dog Food and a Nutrition Standard of Cat Food" prescribed in Pages 45 and 46 of the "Revision of Pet Food Fair Competition Regulations" issued by the Pet Food Fair Trade Commission in Japan.

The dry type pet food includes mainly a solid food treated by heating and foaming (enlarging) and having a moisture content of 12% or less. The dry type pet food also includes foods in a form of biscuits, artificial powder milk, flakes, crumbles (granules), semi-dry type and the like.

The semi-moist soft dry type food includes a food having a moisture content in a range from 25 to 35% in a form of, for example, hamburger and ground meat.

The wet type food includes a food having a high moisture content of 70 to 85%, and a canned food and a retort food fall under this category. There are an oatmeal type food comprising meat and fish meat, and a ration type food comprising vegetables, vitamins, minerals and the like in addition to the meat;

The pet food according to the present invention can be prepared in any form of the dry type, semi-moist soft dry type, or wet type in conformity with the "Nutrition Standards for Dog and Cat Foods" prescribed on Pages 45 and 46 of the "Revision of Pet Food Fair Competition Regulations" issued by the Pet Food Fair Trade Commission, and comprises lactosucrose substantially uniformly mixed in other food in a range of 0.025 to 3.0% by weight as calculated on a dry basis.

This invention is based on earnest study carried out by the inventor on effects when lactosucrose is added to foods for pets such as cats and dogs, wherein when lactosucrose is added to a pet food in a quantity of less than 0.025% by weight as calculated on a dry basis, any remarkable change can not be found in intestinal flora of the pets, nor can be found in deodorizing effect on the discharged faeces. Also, when lactosucrose is added more than 3.0% by weight as calculated on a dry basis, diarrhea or slushy feces often take place to the pets, resulting in injuring pets' health.

Recently, although various kinds of oligosaccharides as additives to pet foods as a functional food in anticipation of a proliferation effect for Bifidobacteria have been developed and used, lactosucrose used in the present invention has a higher selectivity for Bifidobacteria among the thus developed oligosaccharides.

More specifically, although there are various kinds of oligosaccharides such as:

1) fructooligosaccharide obtained from sucrose using β-fructofranosidase,
2) isomaltooligosaccharide obtained from maltose using α-glucosidase, and
3) galactooligosaccharide obtained from lactose using β-galactase, lactosucrose is prepared from lactose and sucrose as a raw material, and is represented by the following chemical formula which is synthesized by glycosyl transition reaction of β-fructooligosaccharide.

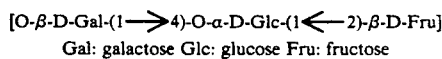

Gal: galactose Glc: glucose Fru: fructose

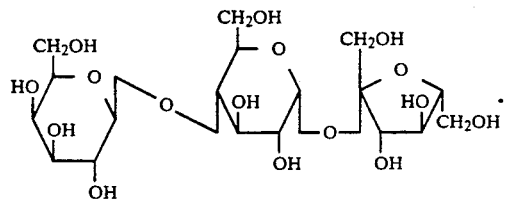

-continued

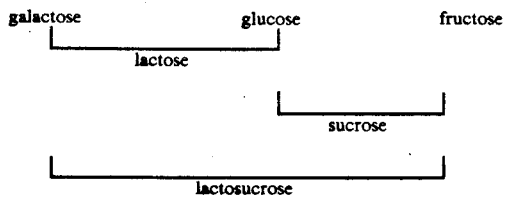

It is said that this lactosucrose is not dissolved by digestion enzymes of a person, but lactosucrose is used by some Bifidobacteria, Bacteroides, Clostridia or the like to provide a favorable effect for a host. Since lactosucrose has a sweet taste and physical properties similar to sugar in addition to the above mentioned effect, use of lactosucrose in a field of food, feed or pet food is anticipated. Since lactosucrose has a sweetness of about 70% of sugar, it has a good taste. However, use of lactosucrose in a field of pet foods for cats and dogs has not been known.

Accordingly, a relationship among intestinal flora of the pets, ammonia of feces discharged by the pets, putrefactive products in intestinal contents, pH, moisture content and odor (fecal odor) will be explained through the following embodiments based on the pet foods prepared by substantially uniformly mixing lactosucrose into pet foods for cats and dogs.

DETAILED DESCRIPTION OF PREFERRED EMBODIMENTS

Embodiment 1

Material and Method

1. Test Animals

Eight shepherd dogs with weights in a range of 22-32 kg (4 female dogs, 4 male dogs)

2. Food

Two types of components comprising 48 parts by weight of corn, 27 parts by weight of lees of soybean, 7 parts by weight of animal oil, 7 parts by weight of gluten meal, 5 parts by weight of chicken meat powder, 4 parts by weight of meat and bone powder, 2 parts by weight of premix and others, one type including 0.25 parts by weight of lactosucrose (trade name "Nyuka Origoto" [LS-50] manufactured by Shiomizuko Seito Co., Ltd.), and the other type excluding lactosucrose, were mixed together and subjected to extruders, respectively, to obtain a foamed or enlarged dry type pet food with lactosucrose and a foamed or enlarged dry type pet food without lactosucrose.

3. Nutrition

The pet foods obtained according to the above mixture showed a nutrition containing 25.7% by weight of crude protein, 10.6% by weight of crude fat, 2.7% by weight of crude fiber, 5.8% by weight of crude ash, 8.1% by weight of moisture content, and 380 kilocalories/100 g (general components are shown by analyzed values, metabolizable energies are shown by calculated values). This nutrition satisfied the Nutrition Standard of Dog Food of a dry type prescribed on Page 45 of the "Revision of Dog Food Fair Competition Regulation" issued by the Pet Food Fair Trade Commission, wherein 20% by weight or more of crude protein and 4.5% by weight or more of crude fat are prescribed, as well as other nutrition elements in a small amount such as vitamins and minerals.

4. Administration Method

The pet food of the foamed dry type prepared as described above is in conformity with requirements for mature dogs prescribed in the Breeding Standard issued by the Academy of U.S. Sciences. The pet food obtained above without lactosucrose was administered for the first week (seven days) at a rate of 600 g/day/dog, the pet food obtained above with lactosucrose was administered for the next two weeks (14 days) at a rate of 600 g/day/dog so that dogs could intake lactosucrose at a rate of 1.5 g/day/dog, i.e., the dog food containing 0.25% by weight of lactosucrose as calculated on a dry basis, and then for another week (seven days) the pet food without lactosucrose obtained above was administered at a rate of 600 g/day/dog.

5. Analyzing Method

Analysis of intestinal flora was carried out by Mitsuoka's method as will be described below, analysis of ammonia was performed by removing protein from 3 g of dog feces by using 6 ml of 10% tungstic acid, 6 ml of 2/3 N sulfuric acid and 15 ml of distilled water, and then ammonia content was measured by an ammonia measuring kit (manufactured by Wako Junyaku).

The putrefactive products of dogs were analyzed by a method of Yoshihara et al as will be described below by means of gas chromatography. pH values were measured by directly inserting a pH meter into the animals. Moisture contents were measured by an ordinary method (Feed Official Method). Nitrogen with volatile salt radical was measured by a method of Nakamura et al as will be described below.

Mitsuoka's method

Mitsuoka, T., Morishita, Y., Terada, A., and Yamamoto, S. 1969. A simple method ('plate-in-bottle-method') for the cultivation of fastidious anaerobes. Jpn. J. Microbiol. 13:383-385

Mitsuoka, T., Sega, T., and Yamamoto, S. 1965. Eine verbeserte Methodik der qualitativen und quantitativen Analyse der Dermflora von Menschen und Tieren. Zbl. Bakt. Hyg. I. Abt. Orig. A195:455-469

Method of Yoshihara et al

Yoshihara, I. 1981 Isothermal gas chromatographic analysis of putrefactive products in gastrointestinal contents and urine using the same dual column system. Agric. Biol. Chem. 45:1873-1875

Method of Nakamura et al

Nakamura, R., H. Yonemura and T. Sudo, Ushino Rinsyo Kensaho, Chap. 6. 39-44 Nobun Kyo, Tokyo 1973 (in Japan)

6. Results a) Effects of lactosucrose intake on intestinal flora of dogs are shown in Table 1, wherein Clostridia lecithinase-positive containing Clostridium perfringens (welchii) was greatly decreased from $10^6$/g to $10^3$/g by the 14th day after intake of lactosucrose when compared with a value before intake thereof, and again increased after stop of intake.

b) Bacterial count of Bifidobacteria increased to a value of approximate 5 times as large as that before intake of lactosucrose, and again decreased after stop of intake. Total bacteria did not change during the experiment.

c) Ammonia of discharged feces and putrefactive products are shown in Tables 2 and 3, wherein by the 14th day after intake of lactosucrose, ammonia, phenol, indole, skatol, and butyric acid significantly decreased thereby to reduce odor of feces. Further, ethylphenol and skatol extremely decreased by the 14th day after intake of lactosucrose, and showed a tendency of increase after stop of intake.

d) Moisture contents and pH values of discharged feces are shown in Table 4. While the moisture contents during intake of lactosucrose increased slightly, the pH values did not change. Further, odor during intake of lactosucrose was greatly removed.

TABLE 1

Effect of Lactosucrose Intake on Intestinal Flora of 8 Dogs

| intestinal flora | before intake day 0 | during intake day 7 | during intake day 14 | after intake day 7 |
|---|---|---|---|---|
| Total bacterial | $3.2 \times 10^{10}$ | $3.2 \times 10^{10}$ | $3.2 \times 10^{10}$ | $4.0 \times 10^{10}$ |
| Bifidobacteria | $7.9 \times 10^8$ | $2.5 \times 10^9$ | $2.5 \times 10^9$ | $6.3 \times 10^8$ |
| Bacteroides | $1.3 \times 10^{10}$ | $1.3 \times 10^{10}$ | $1.6 \times 10^{10}$ | $2.0 \times 10^{10}$ |
| Eubacteria | $1.0 \times 10^9$ | $2.5 \times 10^9$ | $6.3 \times 10^8$ | $6.3 \times 10^8$ |
| Peptococcaceae | $2.5 \times 10^9$ | $1.0 \times 10^9$ | $1.6 \times 10^9$ | $3.2 \times 10^9$ |
| Clostridia lecithinase-positive | $1.0 \times 10^6$ | $2.5 \times 10^4$ | $1.3 \times 10^3$ | $7.9 \times 10^4$ |
| lecithinase-negative | $5.0 \times 10^8$ | $1.0 \times 10^8$ | $3.2 \times 10^8$ | $1.6 \times 10^8$ |
| Lactobacilli | $2.5 \times 10^9$ | $4.0 \times 10^9$ | $5.0 \times 10^9$ | $6.3 \times 10^9$ |
| Enterobacteriaceae | $5.0 \times 10^6$ | $1.0 \times 10^7$ | $6.3 \times 10^6$ | $2.5 \times 10^7$ |
| Streptococci | $3.2 \times 10^9$ | $4.0 \times 10^9$ | $3.2 \times 10^9$ | $4.0 \times 10^9$ |
| Staphylococci | $5.0 \times 10^4$ | $4.0 \times 10^4$ | $6.3 \times 10^3$ | $1.3 \times 10^5$ |
| Bacilli | $2.0 \times 10^3$ | $2.0 \times 10^2$ | $1.6 \times 10^3$ | $2.0 \times 10^2$ |
| Yeasts | $4.0 \times 10^2$ | $4.0 \times 10^2$ | $2.0 \times 10^2$ | $7.9 \times 10^2$ |

(Unit: bacterial count per gram of feces)

TABLE 2

Effect of Lactosucrose Intake on Putrefactive Products in Intestinal Contents of 8 Dogs

| putrefactive products | before intake day 0 | during intake day 7 | during intake day 14 | after intake day 7 |
|---|---|---|---|---|
| Ammonia | 427.4 | 297.7 | 172.5 | 346.2 |
| Phenol | 49.2 | 31.1 | 25.9 | 41.0 |
| Indole | 34.4 | 26.7 | 18.9 | 32.6 |
| p-Cresol | 33.6 | 26.9 | 27.1 | 26.5 |
| Ethylphenol | 8.5 | 3.2 | 0 | 5.3 |
| Skatol | 3.0 | 1.9 | 1.3 | 2.5 |

(Unit: micro-gram/gram in feces)

TABLE 3

Effect of Lactosucrose Intake on Putrefactive Products in Intestinal Contents of 8 Dogs

| putrefactive products | before intake day 0 | during intake day 7 | during intake day 14 | after intake day 7 |
|---|---|---|---|---|
| Acetic acid | 10.11 | 9.80 | 8.77 | 9.25 |
| Propionic acid | 5.23 | 5.25 | 5.27 | 4.63 |
| Butyric acid | 2.56 | 2.62 | 1.53 | 1.75 |
| Iso-butyric acid | 0.07 | 0.17 | 0.22 | 0.20 |
| Valeric acid | 0.56 | 0.58 | 0.88 | 0.34 |
| Iso-valeric acid | 0.21 | 0.24 | 0.59 | 0.26 |

(Unit: mg/g in feces)

TABLE 4

Effect of Lactosucrose Intake on Fecal pH, Moisture and Ammonia Odor of 8 Dogs

| Nature of feces | before intake day 0 | during intake day 7 | during intake day 14 | after intake day 7 |
|---|---|---|---|---|
| pH | 6.0 | 6.1 | 6.0 | 6.4 |
| moisture content | 74.3 | 77.8 | 76.9 | 73.6 |
| odor* | 8/8 | 0/8 | 0/8 | 8/8 |

*Values of odor were measured by inductive inspection of the tester: in the Table, 8/8 in a period of no intake of lactosucrose represents that feces of all eight dogs have odor, while 0/8 in a period of intake of lactosucrose represents that feces of all eight dogs have no odor.

Embodiment 2

Material and Method

1. Test animals

Eight Japanese cats with weights in a range of 3.5 to 5.0 kg (4 female cats, 4 male cats)

2. Food

Two types of components comprising 36 parts by weight of corn, 18 parts by weight of lees of soybean, 6.5 parts by weight of animal oil, 16 parts by weight of gluten meal, 11 parts by weight of chicken meat powder, 5 parts by weight of wheat flour, 7.5 parts by weight of premix and others, one type including 0.25 parts by weight of lactosucrose (trade name "Nyuka Origoto" [LS-50] manufactured by Shiomizuko Seito Co., Ltd.), and the other type excluding lactosucrose, were mixed together and subjected to extruders, respectively, to obtain a foamed or enlarged dry type pet food with lactosucrose and a foamed or enlarged dry type pet food without lactosucrose.

3. Nutrition

The pet foods obtained according to the above mixture contained 30.2% by weight of crude protein, 9.7% by weight of crude fat, 2.2% by weight of crude fiber, 5.5% by weight of crude ash, 9.8% by weight of moisture content, and 390 kilocalories/100 g (general components are shown by analyzed values, and metabolizable energies are shown by calculated values). These values satisfied the Nutrition Standards of cat food of a dry type prescribed in Page 46 of the "Revision of Cat Food Fair Competition Regulation" issued by the Pet Food Fair Trade Commission wherein 25.2% by weight or more of crude protein and 8.1% by weight or more of crude fat are prescribed.

4. Administration Method

The pet food of the foamed dry type prepared as described above is in conformity with data for mature cats prescribed in the Breeding Standard issued by the Academy of U.S. Sciences. The pet food prepared above without lactosucrose was administered for the first week (seven days) at a rate of 100 g/day/cat, the pet food prepared above with lactosucrose was administered for the next two weeks (14 days) at a rate of 100 g/day/cat so that cats were able to intake lactosucrose at a rate of 0.25 g/day/cat, i.e., the cat food containing 0.25% by weight of lactosucrose as calculated on a dry basis, and for the next one week (seven days) the pet food without lactosucrose obtained above was administered at a rate of 100 g/day/cat.

5. Analyzing Method

An analysis was carried out as in the dog case.

6. Results a) Effects of lactosucrose intake on intestinal flora of the 8 cats are shown in Table 5, wherein Bifidobacteria greatly proliferated, and lactobacillus slightly increased.

b) Ammonia, indole and phenol in feces and ammonia in urine as shown in Table 6 significantly decreased while the cat food containing lactosucrose therein was administered, and deodorizing effects on the feces and urine discharged by the cats were confirmed as in the case of the dogs.

c) pH values, moisture contents and deodorizing effects as shown in Table 7 were as in the case of the dogs, wherein pH values slightly decreased, moisture contents slightly increased, and deodorizing effects were confirmed while the cat food containing lactosucrose therein was administered.

d) Ammonia values in a breeding room in which 8 cats were fed in accordance with the above-mentioned administration method, were measured as shown in Table 8, wherein a great deodorizing effect was confirmed while feeding of the pet food containing lactosucrose.

TABLE 5

Effect of Lactosucrose Intake on Intestinal Flora of 8 Cats

| intestinal flora | before intake day 0 | during intake day 7 | during intake day 14 | after intake day 7 |
|---|---|---|---|---|
| Total bacterial | $5.3 \times 10^{10}$ | $4.3 \times 10^{10}$ | $6.3 \times 10^{10}$ | $4.3 \times 10^{10}$ |
| Bifidobacteria | — | $1.0 \times 10^{9}$ | $4.8 \times 10^{8}$ | $5.7 \times 10^{8}$ |
| Bacteroides | $2.5 \times 10^{10}$ | $2.5 \times 10^{10}$ | $4.0 \times 10^{10}$ | $2.4 \times 10^{10}$ |
| Fusobacteria | $1.2 \times 10^{9}$ | $7.5 \times 10^{7}$ | $8.0 \times 10^{8}$ | $8.2 \times 10^{8}$ |
| Eubacteria | $1.6 \times 10^{9}$ | $1.0 \times 10^{9}$ | $6.0 \times 10^{8}$ | $1.0 \times 10^{9}$ |
| Peptococcaceae | $4.0 \times 10^{9}$ | $8.5 \times 10^{9}$ | $4.8 \times 10^{9}$ | $5.3 \times 10^{9}$ |
| Spirochaetaceae | $4.7 \times 10^{8}$ | $6.0 \times 10^{9}$ | $1.9 \times 10^{9}$ | $6.0 \times 10^{9}$ |
| Clostridia lecithinase-positive | $8.8 \times 10^{9}$ | $1.2 \times 10^{9}$ | $2.8 \times 10^{9}$ | $8.6 \times 10^{9}$ |
| lecithinase-negative | $1.3 \times 10^{8}$ | $5.6 \times 10^{7}$ | $1.0 \times 10^{9}$ | $2.2 \times 10^{8}$ |
| Lactobacilli | $2.8 \times 10^{8}$ | $2.7 \times 10^{9}$ | $2.2 \times 10^{9}$ | $2.9 \times 10^{8}$ |
| Enterobacteriaceae | $3.5 \times 10^{8}$ | $1.0 \times 10^{5}$ | $7.0 \times 10^{6}$ | $8.5 \times 10^{7}$ |
| Streptococci | $5.9 \times 10^{8}$ | $1.3 \times 10^{8}$ | $1.0 \times 10^{9}$ | $5.0 \times 10^{8}$ |
| Staphylococci | $1.5 \times 10^{5}$ | $1.9 \times 10^{3}$ | $2.9 \times 10^{4}$ | $6.2 \times 10^{3}$ |
| Bacilli | $8.0 \times 10^{4}$ | $2.0 \times 10^{3}$ | — | $5.0 \times 10^{2}$ |
| Corynebacteria | $2.9 \times 10^{7}$ | $1.9 \times 10^{9}$ | — | — |
| Yeasts | $3.5 \times 10^{2}$ | $2.2 \times 10^{2}$ | $7.9 \times 10^{2}$ | $3.0 \times 10^{2}$ |
| Molds | $1.8 \times 10^{2}$ | $5.6 \times 10^{2}$ | — | — |

(Unit: bacterial count per gram of feces)

TABLE 6

Effect of Lactosucrose Intake on Putrefactive Products in Intestinal Contents of 8 Cats

| putrefactive products | before intake day 0 | during intake day 7 | during intake day 14 | after intake day 7 |
|---|---|---|---|---|
| Feces: | | | | |
| Ammonia | 338.8 | 159.7 | 161.5 | 366.7 |
| Phenol | 39.2 | 30.9 | 27.0 | 52.1 |
| p-Cresol | 55.2 | 34.6 | 33.1 | 69.7 |
| Ethylphenol | 19.6 | 10.9 | 7.6 | 29.6 |
| Indole | 48.3 | 17.8 | 29.7 | 69.9 |
| Skatol | 8.2 | 4.7 | 4.9 | 8.6 |
| Urine: | | | | |
| Ammonia | 17.2 | 13.7 | 9.8 | 16.3 |

(Unit: microgram/gram in feces, milligram/milliliter in urine)

TABLE 7

Effect of Lactosucrose Intake on Nature of Feces of 8 Cats

| nature of feces | before intake day 0 | during intake day 7 | during intake day 14 | after intake day 7 |
|---|---|---|---|---|
| pH | 6.3 | 6.0 | 6.1 | 6.4 |

TABLE 7-continued

Effect of Lactosucrose Intake on Nature of Feces of 8 Cats

| nature of feces | before intake day 0 | during intake day 7 | during intake day 14 | after intake day 7 |
|---|---|---|---|---|
| moisture content (%) | 76.1 | 77.3 | 78.4 | 75.6 |
| weight (g) | 49.8 | 55.0 | 53.1 | 51.3 |

TABLE 8

Effect of Lactosucrose Intake on Ammonia Odor in Breeding Room of 8 Cats

| ammonia in breeding room (ppm) | before intake day 0 | during intake day 7 | during intake day 14 | after intake day 7 |
|---|---|---|---|---|
| Ammonia | 22.0 | 13.0 | 15.7 | 28.3 |

Ammonia detector: Kitagawa Type Gas Rack
Breeding Room: 3.6 m × 2.7 m × 2.4 m
Value: Average values measured in upper, middle and below portions of the room at two hours later after ventilator in the breeding room was stopped.

As described hereinabove, the pet food according to the present invention comprises lactosucrose substantially uniformly mixed in a food in a range of 0.025 to 3.0% by weight as calculated on a dry basis without damaging inherent taste and nature of the food. If the pet food is fed daily to the pets such as dogs and cats, it functions to keep intestines of the pets in order and to greatly decrease unpleasant odors of feces and urine discharged by the pets so that it is possible to solve a problem of unpleasant odors of wastes discharged by the pets and to breed the pets in a clean atmosphere. Accordingly, the pet food of the present invention makes an epoch-making contribution to this field which is a great boon to owners of pets as companions.

While the invention has been explained with reference to the specific embodiments of the invention, the explanation is illustrative and the invention is limited only by the appended claims.

What is claimed is:

1. Pet food comprising a meal, and lactosucrose substantially uniformly mixed in the meal in a range of 0.025 to 3.0% by weight of the meal as calculated on a dry basis thereof so that odor of feces and urine of an animal eating the pet food is reduced, said lactosucrose being represented by a chemical formula:

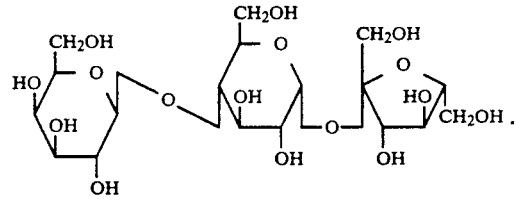

2. Pet food according to claim 1, wherein said lactosucrose has a property to activate Bifidobacteria.

3. A method of use of lactosucrose, comprising adding lactosucrose to a meal in a range of 0.025 to 3.0% by weight of the meal as calculated on a dry basis of the meal so that odor of feces and urine of an animal eating the lactosucrose is reduced, said lactosucrose being represented by a following chemical formula:

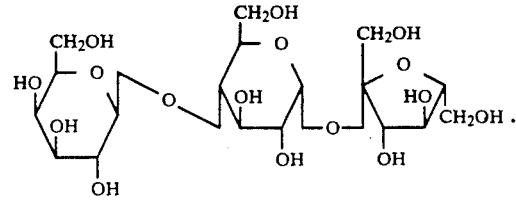

* * * * *